United States Patent [19]

Piccoli et al.

[11] Patent Number: 5,276,431
[45] Date of Patent: * Jan. 4, 1994

[54] SECURITY TAG FOR USE WITH ARTICLE HAVING INHERENT CAPACITANCE

[75] Inventors: Anthony F. Piccoli, Audubon; Gary T. Mazoki, Sewell, both of N.J.

[73] Assignee: Checkpoint Systems, Inc., Thorofare, N.J.

[*] Notice: The portion of the term of this patent subsequent to Jan. 14, 2009 has been disclaimed.

[21] Appl. No.: 875,844

[22] Filed: Apr. 29, 1992

[51] Int. Cl.$^5$ .............................................. G08B 13/14
[52] U.S. Cl. ................................... 340/572; 324/675; 340/658
[58] Field of Search ............... 340/572, 573, 551, 658; 324/663, 674, 675, 707, 708

[56] References Cited

U.S. PATENT DOCUMENTS

| | | | |
|---|---|---|---|
| 3,913,219 | 1/1975 | Lichtblau | 29/592 |
| 4,021,705 | 5/1977 | Lichtblau | 361/402 |
| 4,087,791 | 5/1978 | Lemberger | 340/572 X |
| 4,369,557 | 1/1983 | Vandebult | 29/25.42 |
| 4,413,254 | 11/1983 | Pinneo et al. | 340/572 |
| 4,471,344 | 9/1984 | Williams | 340/572 |
| 4,498,076 | 2/1985 | Lichtblau | 340/572 |
| 4,598,276 | 7/1986 | Tait | 340/572 |
| 4,618,822 | 10/1986 | Hansen | 340/572 X |
| 4,700,179 | 10/1987 | Fancher | 340/572 |
| 4,717,438 | 1/1988 | Benge et al. | 156/152 |
| 4,778,552 | 10/1988 | Benge et al. | 156/272.2 |
| 4,783,646 | 11/1988 | Matsuzaki | 340/572 |
| 4,792,790 | 12/1988 | Reeb | 340/572 |
| 4,802,944 | 2/1989 | Benge | 156/247 |
| 4,818,312 | 4/1989 | Benge | 156/52 |
| 4,823,234 | 4/1989 | Konishi et al. | 361/386 |
| 4,843,404 | 6/1989 | Benge et al. | 343/895 |
| 4,846,922 | 7/1989 | Benge et al. | 156/324 |
| 4,864,280 | 9/1989 | van de Meij | 340/572 |
| 4,885,571 | 12/1989 | Pauley et al. | 340/573 |
| 4,910,499 | 3/1990 | Benge et al. | 340/572 |
| 4,940,966 | 7/1990 | Pettigrew et al. | 340/551 |
| 4,954,814 | 9/1990 | Benge | 340/572 |
| 4,960,651 | 10/1990 | Pettigrew et al. | 428/607 |
| 5,081,446 | 1/1992 | Gill et al. | 340/572 |

*Primary Examiner*—John K. Peng
*Assistant Examiner*—Thomas J. Mullen, Jr.
*Attorney, Agent, or Firm*—Panitch Schwarze Jacobs & Nadal

[57] ABSTRACT

A security tag for use with an electronic security system is used for attachment to an article having an inherent capacitance such as meat. The security system includes a transmitter for transmitting into a surveilled area electromagnetic energy having a center frequency within a predetermined detection frequency range and a receiver for detecting within the surveilled area the presence of a security tag resonating at a frequency within the detection frequency range in response to the electromagnetic energy. The tag includes a generally planar dielectric substrate having a first side and a second side. Circuitry on the substrate establishes a resonant circuit having a resonant frequency which is initially a predetermined frequency interval above the center frequency of the detection frequency range. Upon attachment of the security tag to the article, the inherent capacitance of the article interacts with the resonant circuit to shift the resonant frequency of the resonant circuit downwardly, closer to the center frequency of the detection frequency range.

5 Claims, 3 Drawing Sheets

SECURITY TAG FOR USE WITH ARTICLE HAVING INHERENT CAPACITANCE

BACKGROUND OF THE INVENTION

The present invention relates generally to security tags used with electronic security systems for detecting the presence or unauthorized removal of articles and, more particularly, to such security tags which are particularly adapted for use with articles having an inherent capacitance.

The use of electronic security systems for detecting and preventing theft or other unauthorized removal of articles or goods from retail establishments and/or other facilities, such as libraries, has become widespread. In general, such security systems employ a security tag which is associated with or is secured to an article (or its packaging) which is readily accessible to potential customers or facility users and, therefore, may be easily removed. Security tags may take on many different sizes, shapes and forms, depending upon the particular type of security system in use, the type and size of the article, its packaging, etc. In general, such electronic security systems are employed for detecting the presence (or the absence) of a security tag and, thus, a protected article, as the protected article passes through or near a surveilled security area. In most cases, the surveilled area is located at or around an exit or entrance to a retail establishment or other facility.

One such electronic article security system which has gained widespread popularity utilizes a security tag which includes a self-contained, operatively tuned or resonant circuit in the form of a small, generally planar printed circuit which resonates at a predetermined frequency within a predetermined detection frequency range. A transmitter, which is tuned to a frequency within the detection frequency range, is employed for transmitting electromagnetic energy into the surveilled area. A receiver, also tuned to the detection frequency range, is positioned generally proximate to the surveilled area. Typically, the transmitter is located on one side of an exit and the receiver is located on the other side of the exit so that a person must pass between the transmitter and the receiver in order to exit the facility. In this manner, when an article having an attached security tag moves into or otherwise passes through the surveilled area, the tag is exposed to the transmitted energy. Upon receiving the transmitted energy, the resonant circuit of the tag resonates, providing an output signal detectable by the receiver. When the receiver detects such an output signal, indicative of the presence of an article with a security tag within the surveilled area, the receiver activates an alarm to alert appropriate security or other personnel.

Electronic article security systems of the type discussed above have been shown to be very effective in preventing the theft or unauthorized removal of articles, particularly articles which are relatively high in value and relatively small in size, such as jewelry, expensive clothing, video cassettes, etc. While such electronic article security systems have been generally effective, there are certain articles having properties which have made it difficult to effectively use such electronic article security systems. For example, it has been found that certain articles, such as articles containing liquid, or certain organic articles, such as meat or living animals (including humans), possess inherent electrical properties, usually inherent capacitance. When a security tag is attached to such an article, the inherent capacitance of the article interacts with the resonant circuit of the tag generally adding both capacitance and resistance to the resonant circuit. The addition of capacitance and resistance to the resonant circuit affects both the resonant frequency of the circuit and the Q factor of the circuit. It has been determined that in a typical standard security tag having an inductance/capacitance resonant circuit, attachment of the tag to an article having an inherent capacitance typically results in a shifting of the resonant frequency of the resonant circuit in the range of 500 to 1500 KHz and a reduction in the Q factor of the circuit in the range of from 40 to 80 percent. The precise shift in the resonant frequency of the circuit and the precise reduction in the Q factor depends upon many variables, including the particular material of the article and its electrical conductivity, the size of the article, the proximity of the tag to the article, the temperature of the article, etc. However, such a shift in the resonant frequency when coupled with such a reduced Q factor, in the case of some articles, is sufficient to so diminish the performance of the resonant circuit as to materially diminish the effectiveness of the electronic article security system for use in detecting the unauthorized removal or presence of such articles.

The present invention relates to an article compensating security tag which is particularly adapted for use with an article having inherent electrical properties, such as inherent capacitance, which interact with the circuitry of the security tag. The security tag of the present invention is particularly well suited for protecting meat, particularly expensive cuts of meat. A security tag made in accordance with the present invention is designed to provide an initial resonant frequency which is above the center frequency of the article security system so that when the tag is attached to an article having such inherent capacitance, the inherent capacitance interacts with the resonant circuit to shift the resonant frequency of the resonant circuit closer to the center frequency of the security system.

SUMMARY OF THE INVENTION

Briefly stated, the present invention comprises a security tag for use with an electronic security system for a surveilled area. The security system includes transmitter means for transmitting into the surveilled area electromagnetic energy having a center frequency within a predetermined detection frequency range and receiver means for detecting within the surveilled area the presence of a security tag resonating at a frequency within the detection frequency range in response to transmitted electromagnetic energy. The security tag is adapted for attachment to an article having inherent capacitance and comprises a generally planar dielectric substrate having a first side and a second side. Circuitry means on the substrate is included for establishing a resonant circuit having a resonant frequency which is initially a predetermined frequency interval above the center frequency of the detection frequency range. Upon attachment of the security tag to the article, the inherent capacitance of the article interacts with the resonant circuit to shift the resonant frequency of the resonant circuit downwardly, closer to the center frequency of the detection frequency range. In the preferred embodiment, the circuit means comprises an inductance and a capacitance wherein the ratio of the capacitance to the inductance is in the range of 100 or more picofarads to 1 microHenry.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred, it being understood, however, that the invention is not limited to the precise arrangements and instrumentalities disclosed.

In the drawings.

DESCRIPTION OF PREFERRED EMBODIMENT

Figure 1:
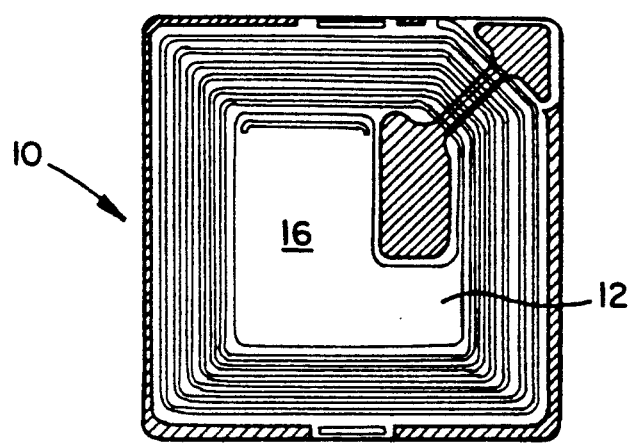
FIG. 1 is a bottom plan view of a typical prior art security tag having a transparent substrate.
Figure 2:
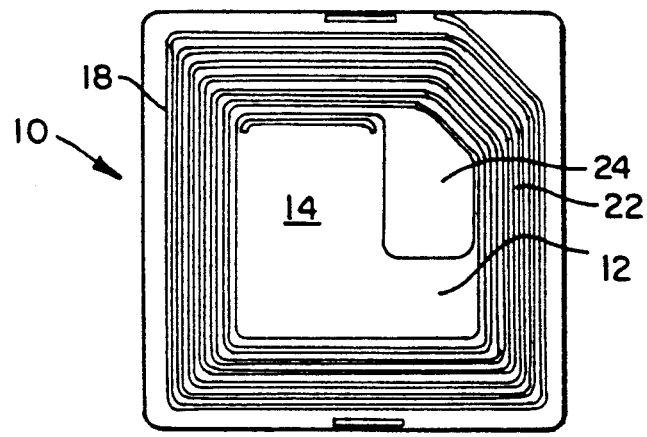
FIG. 2 is a plan view of the security tag shown in FIG. 1 illustrating only the conductive pattern on a first side of the substrate.
Figure 3:
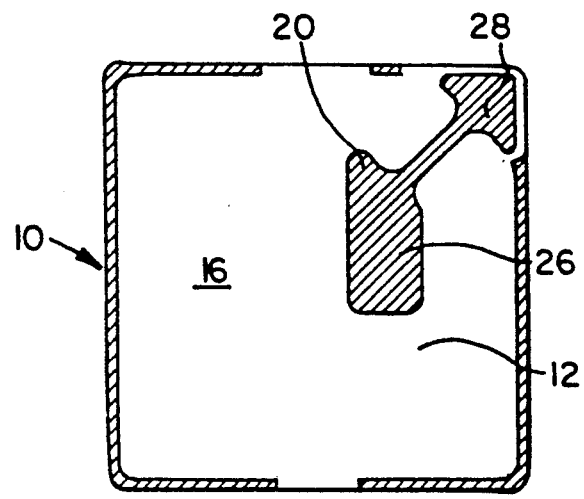
FIG. 3 is a plan view of the security tag of FIG. 1 illustrating only the conductive pattern on the second side of the substrate.
Figure 7:
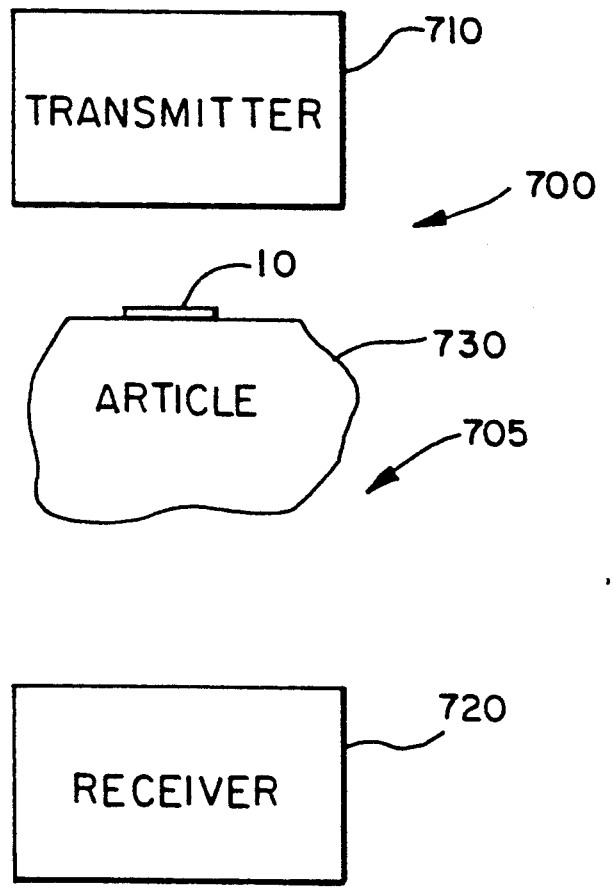
FIG. 7 is a functional schematic diagram of an electronic article security system with which the security tag of FIG. 1 may be employed.

Referring to the drawings, wherein the same reference numerals are applied to corresponding components throughout the several figures, there is shown in FIGS. 1-3 a security tag 10 for use with an electronic security system (700 FIG. 7) for a surveilled area. The tag 10 is generally of a type which is well known in the art of electronic article security systems. The tag 10 is comprised of a generally square, planar dielectric substrate 12 having a first primary side or surface 14 and a second primary side or surface 16. Preferably the substrate 12 is comprised of an insulated dielectric material of a type well known in the art, for example, a polymeric material, preferably polyethylene. However, it will be recognized by those skilled in the art that other dielectric materials may alternatively be employed in forming the substrate 12.

The tag 10 is further comprised of circuitry means located on the substrate 12 for establishing a resonant circuit by forming predetermined circuit elements or components which will hereinafter be described. The circuit elements are formed by a combination of a first conductive pattern 18 imposed on the first side or surface 14 of the substrate 12 (best seen in FIG. 2), and a second conductive pattern 20 imposed on the opposite or second side or surface 16 of the substrate 12 (best seen in FIG. 3). The conductive patterns 18 and 20 are formed on the first and second surfaces 14 and 16 of the substrate 12 utilizing electrically conductive materials of a known type, such as aluminum, and in a manner which is well known in the electronic article surveillance art. One method of forming such conductive patterns is described in detail in U.S. Pat. No. 3,913,219 entitled "Planar Circuit Fabrication Process" which is incorporated herein by reference. While it is preferred that the materials and methods set forth in the above-referenced U.S. Pat. No. 3,913,219 and other prior art be employed for the purpose of fabricating the security tag 10, it will be appreciated by those skilled in the art that other suitable materials and/or fabrication methods could alternatively be employed.

The first and second conductive patterns 18 and 20 establishes a resonant circuit having a resonant frequency within the detection frequency range of an electronic article security system 700 with which the security tag 10 is employed. In the case of tag 10, the resonant circuit is comprised of an inductance which is electrically connected in parallel with a capacitance. As best shown in FIG. 2, the inductance is comprised of a single inductor element formed by the coil portion 22 of the first conductive pattern 18. Correspondingly, in the case of tag 10, the capacitance is comprised of a single capacitor element having a first plate formed by the generally rectangular land portion 24 of the first conductive pattern 18 and a second plate formed by the corresponding, aligned generally rectangular land portion 26 of the second conductive pattern 20. The conductive land portions 24 and 26 are separated by the dielectric substrate 12 to form the capacitor element.

As best shown in FIG. 2, the first plate of the capacitor element, conductive land portion 24, is electrically connected to one end of the inductor coil portion 22. Similarly, the second plate of the capacitor element, conductive land portion 26, is electrically connected by a weld connection (not shown) extending through the substrate proximate the land extension 28 to the other end of the inductor coil portion 22 thereby connecting the inductor element and the capacitor element in parallel in a manner well known in the art. While the prior art tag 10 as illustrated includes a single inductor element and a single capacitor element, multiple inductor and capacitor elements could alternatively be employed.

As discussed above, as illustrated in FIG. 7, the security tag 10 is used with an electronic security system 700 employed to provide article security for a surveilled security area 705. The security system includes a transmitter means or transmitter 710 of a type well known in the art for transmitting into the surveilled area 705 electromagnetic energy, preferably radio frequency energy, within a predetermined detection frequency range in the illustrated embodiment, about 8.2 MHz. The electronic security system further includes a receiver means or receiver 720, also of a type well known in the art, for detecting the presence of a security tag 10 resonating within the surveilled area 705 in response to the transmitted electromagnetic energy. Electronic security systems of this type are generally well known in the art and are commercially available from several manufacturers including Checkpoint Systems, Inc., the assignee of the present invention. Such electronic security systems are described in detail in U.S. Pat. Nos. 4,692,744 and 4,831,363, each of which is incorporated herein by reference. Complete details of the structure and operation of such electronic security systems are not necessary for an understanding of the present invention. Such details may be obtained by referring to the above-identified patents and/or from the manufacturers of such electronic security systems.

Security tags made in accordance with the prior art are designed so that the resonant circuit established by the parallel inductance and capacitance elements has a resonant frequency which is the same as or is in close proximity to the center frequency of the detection range employed in the electronic security system 700 with which the security tag 10 is to be used. Thus, when the security tag 10 is expected to be used in connection with an electronic security system operating with a detection frequency range having a center frequency of 8.2 MHz, the inductance and capacitance of the security tag are generally designed to establish the resonant frequency at 8.2 MHz or as close to 8.2 MHz as possible. Other design criteria employed in designing the prior art security tag 10 included making the tag as small and unobtrusive as possible while maximizing the Q factor of the resonant circuit in order to enhance circuit performance and the detectability of the presence of a tag within the surveilled area 705. Typically, the ratio of the capacitance (measured in picofarads) to the inductance (measured in microHenrys) in a prior art resonant circuit, such as the circuit of the tag 10 shown in FIGS. 1-3, is in the range of about 40-80 to 1 and the Q factor of the circuit is about 50-80 Q.

It has been determined that when a prior art security tag 10 of the type shown in FIGS. 1-3 is attached to an article 730 having inherent electrical properties, particularly inherent capacitance, the electrical performance of the resonant circuit is significantly altered. The inherent capacitance of the article 730 adds both capacitance and resistance to the resonant circuit of the tag thereby affecting both the resonant frequency of the resonant circuit and the Q factor of the circuit. For example, when applying a prior art security tag 10 to a package of meat, the resonant frequency of the resonant circuit typically shifts downwardly in the range of from 500 to 1,500 KHz. The Q factor of the circuit is also reduced typically between 40 and 80 percent. Such a shift in the resonant frequency of the resonant circuit coupled with such a significant reduction in the Q factor of the resonant circuit greatly reduces the detectability of the prior art security tag 10 and, correspondingly, greatly reduces the overall effectiveness of an electronic security system to a non-acceptable level.

The present invention overcomes the drawbacks of the prior art security tag 10 by providing a security tag 30 which compensates for the capacitance inherent in an article to which the tag 30 is to be secured. The security tag 30 in accordance with the present invention is similar in structure to the prior art security tag 10. Specifically, the security tag 30 includes a generally rectangularly shaped planar dielectric substrate 32 having a first primary side or surface 34 and a second primary side or surface 36. The substrate is preferably formed of an insulated dielectric material of a type well known in the art, preferably a polymeric material, such as polyethylene. It will be recognized by those skilled in the art that the substrate could be made of other dielectric materials.

Figure 4:
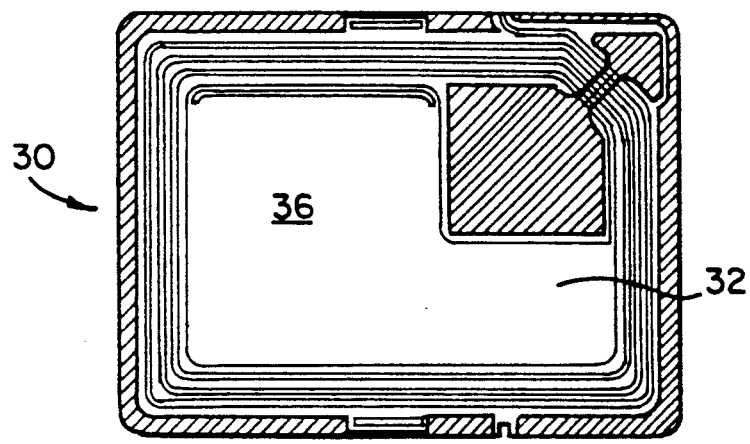
FIG. 4 is a bottom plan view of a security tag having a transparent substrate in accordance with the present invention.

For reasons which will hereinafter become apparent, the security tag 30 is generally larger in total area than the prior art security tag 10. In the embodiment illustrated in FIGS. 4-6, the total area of the first surface 34 and the second surface 36 is approximately twice as large as the total area of the first and second surfaces 14 and 16 of the prior art security tag 10.

The security tag 30 is further comprised of circuitry means located on the substrate for establishing a resonant circuit. As with the prior art security tag 10, the circuit elements are comprised of an inductance and a capacitance and are formed by a combination of a first conductive pattern 38 imposed on the first substrate surface 34 (best seen in FIG. 5) and a second conductive pattern 40 imposed on the opposite or second substrate surface 36 (best seen in FIG. 6). The conductive patterns 38 and 40 are formed on the first and second substrate surfaces 34 and 36, preferably in the same manner as discussed above in connection with the prior art security tag 10.

Figure 5:
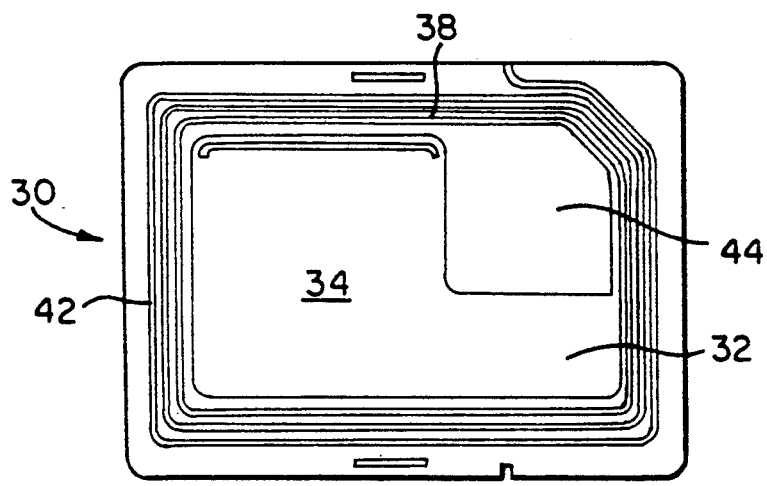
FIG. 5 is a plan view of the security tag of FIG. 4 illustrating only the conductive pattern on the first side of the substrate.
Figure 6:
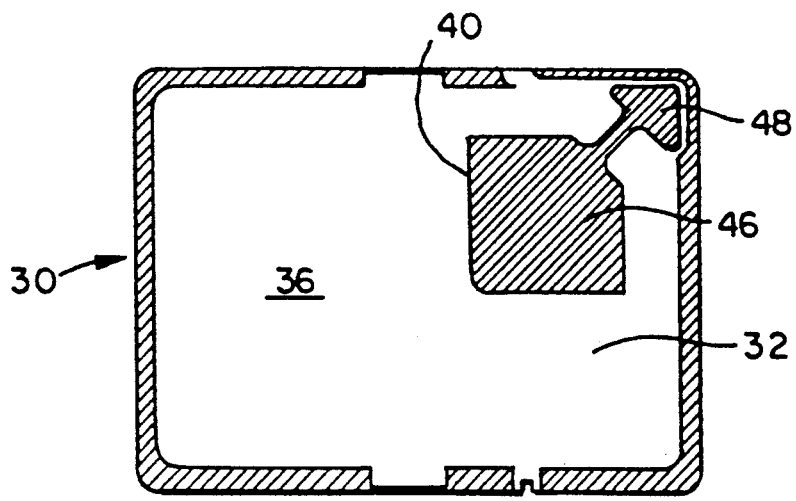
FIG. 6 is a plan view of the security tag of FIG. 4 illustrating only the conductive pattern on the second side of the substrate.

Likewise, the resonant circuit of the present security tag 30 is comprised of a single inductor element formed by the coil portion 42 on the first conductive pattern 38 and a single capacitor element having a first plate formed by the generally diamond shaped land portion 44 of the first conductive pattern and a second plate formed by the corresponding, aligned generally diamond shaped land portion 46 of the second conductive pattern 40. The conductive land portions 44 and 46 are separated by the dielectric substrate to form the capacitor element. The first plate of the capacitor element is electrically connected to one end of the inductor coil portion 42 as illustrated in FIG. 5. The second plate of the capacitor element is electrically connected by a weld connection (not shown) extending through the substrate proximate the land extension 48 to the other end of the inductor coil portion 42 thereby connecting the inductor element and the capacitor element in parallel. While only a single inductor element and a single capacitor element are used in the present embodiment, it should be understood that more than one inductor and/or capacitor element could alternatively be employed.

As discussed above, the security tag 30 has been specifically designed in order to compensate for the effects that inherent electrical properties, particularly inherent capacitance, have upon the electrical performance of a typical prior art tag resonant circuit. More specifically, since it is known that the additional capacitance provided to the resonant circuit when such a tag is secured to an article having inherent capacitance, the size of the capacitor element of tag 30 has been increased relative to the size of the capacitor element of tag 10. In this manner, the capacitance inherent in the article which is added to the resonant circuit when the security tag 30 is secured to the article becomes a much smaller proportion of the total capacitance of the resonant circuit (capacitor element plus inherent capacitance) thereby greatly diminishing the effects of the inherent capacitance upon the resonant circuit.

In addition to diminishing the effects of the inherent capacitance with respect to the overall capacitance of the resonant circuit, the resonant frequency of security tag 30 is initially established to be a predetermined frequency interval above the center frequency of the detection frequency range of the security system with which the security tag 30 is to be used. The initial resonant frequency may be established anywhere in the range of up to 600 KHz above the center frequency of the electronic article security system. In the presently preferred embodiment illustrated in FIGS. 4-6, the security tag is designed for use in an electronic article security system operating at a center frequency of 8.2 MHz and the initial resonant frequency of the tag 30 is selected to be 8.4 MHz. In this manner, upon attachment of the security tag to an article having inherent capacitance, the interaction of the inherent capacitance of the article with the security tag shifts the resonant frequency of the resonant circuit downwardly closer to the center frequency of the electronic article surveillance system.

In order to improve the performance of the resonant circuit of tag 30, the capacitance to inductance ratio has been increased relative to the capacitance to inductance ratio of the prior art security tag 10. It is preferred that the ratio of the capacitance to inductance of the resonant circuit of tag 30 be 100 or more picofarads to 1 microHenry and preferably be in the range of 150 to 250 picofarads to 1 microHenry. Utilizing such a capacitance to inductance ratio, while allowing for the use of a much larger capacitor to diminish the effects of the additional inherent capacitance of the article, also minimizes the reduction in the Q factor of the resonant circuit typically resulting in a reduction in the Q factor of the circuit of 45 percent or less. These factors, coupled with the larger overall area of the security tag 30, results in significantly enhanced performance and detectability in an electronic article security system as compared to the prior art tag 10 when used with an article having inherent capacitance. It has also been found that detection performance can be further enhanced by orienting the security tag 30 so that the second substrate side 36 is facing the article when the tag is attached to an article having inherent capacitance.

It will be appreciated that the features of security tag 30 may be modified for particular uses. For example, security tag 30 could be modified by placing an indentation or "dimple" within one of the generally diamond shaped land portions 44 or 46 to thereby permit the tag 30 to be deactivated by exposing the tag to electromagnetic energy at a sufficient level to cause the portion of the substrate proximate the dimple to break down and short circuit the capacitor element thereby precluding the resonant circuit from resonating. Such deactivation techniques are well known to those skilled in the art and are described in greater detail in U.S. Pat. No. 4,496,076, the disclosure of which is incorporated herein by reference.

It will also be appreciated by those skilled in the art that a security tag 30 which has the ability to compensate for inherent capacitance may be employed in varying applications. As discussed above, security tag 30 may be employed on meat, particularly expensive cuts of meat. Such tags may also be employed in connection with articles containing liquid, particularly liquid containers which also have a relatively high conductivity. In addition, security tag 30 could be employed in connection with a system for identifying the presence of living organisms such as animals or even humans. It should, therefore, be clearly understood that the security tag 30 is not limited to a particular application but could be employed in any application in which the article (object, animal, etc.) has an inherent capacitance, particularly an inherent capacitance which would so detrimentally effect the performance of a prior art resonant circuit as to diminish the detectability of the circuit to an unacceptable level.

From the foregoing description, it can be seen that the present invention comprises a security tag which is particularly adapted for compensating for the inherent capacitance of an article to which the tag may be secured. It will be recognized by those skilled in the art that changes may be made to the above-described embodiment of the invention without departing from the broad inventive concepts thereof. It is understood, therefore, that this invention is not limited to the particular embodiment disclosed, but is intended to cover any modifications which are within the scope and spirit of the invention as defined by the appended claims.

What is claimed is:

1. A security tag for use with an electronic security system for a surveilled area including transmitter means for transmitting into the surveilled area electromagnetic energy having a center frequency within a predetermined detection frequency range and receiver means for detecting within the surveilled area the presence of a security tag resonating at a frequency within the detection frequency range in response to said electromagnetic energy, the security tag for attachment to an article having an inherent capacitance, the security tag comprising:

a dielectric substrate having a first side and a second side; and circuitry means on the substrate for establishing a resonant circuit having a resonant frequency which is initially a predetermined frequency interval above the center frequency of the detection frequency range whereby upon attachment of the security tag to the article, the inherent capacitance of the article interacts with the resonant circuit to shift the resonant frequency of the resonant circuit downwardly, closer to the center frequency of the detection frequency range.

2. The security tag as recited in claim 1 wherein the circuitry means comprises an inductance and a capacitance.

3. The security tag as recited in claim 2 wherein the ratio of the capacitance of the resonant circuit to the inductance of the resonant circuit is in the range of 100 or more picofarads to 1 microHenry.

4. The security tag as recited in claim 3 wherein the resonant frequency of the resonant circuit is initially established in the range of up to 600 KHz above the center frequency.

5. The security tag as recited in claim 2 wherein the inductance is located on the first side of the substrate and at least a portion of the capacitance is located on the second side of the substrate and wherein the tag is adapted to be secured to the article with the second side facing the article.

* * * * *